United States Patent
Komatsu et al.

(10) Patent No.: US 12,541,965 B2
(45) Date of Patent: Feb. 3, 2026

(54) INFORMATION PROCESSING SYSTEM CAPABLE OF PREVENTING IMITATION OF CONFIGURATION OF NEURAL NETWORK, METHOD OF CONTROLLING IMAGE PROCESSING SYSTEM, AND STORAGE MEDIUM

(71) Applicant: CANON KABUSHIKI KAISHA, Tokyo (JP)

(72) Inventors: Takayuki Komatsu, Kanagawa (JP); Dai Miyauchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 18/162,733

(22) Filed: Feb. 1, 2023

(65) Prior Publication Data
US 2023/0267723 A1 Aug. 24, 2023

(30) Foreign Application Priority Data
Feb. 18, 2022 (JP) .................... 2022-023634

(51) Int. Cl.
*G06V 10/82* (2022.01)

(52) U.S. Cl.
CPC .................... *G06V 10/82* (2022.01)

(58) Field of Classification Search
CPC ........ G06V 10/82; G06N 3/098; G06N 3/063; G06N 5/01; G06N 20/10; G06N 3/084
USPC .......................................... 382/158
See application file for complete search history.

(56) References Cited

FOREIGN PATENT DOCUMENTS

| JP | 2014109800 A | | 6/2014 |
|---|---|---|---|
| JP | 2016024700 A | | 2/2016 |
| JP | 2020205127 A | * | 12/2020 |
| JP | 2021124832 A | | 8/2021 |
| WO | 2018/011842 A1 | | 4/2019 |
| WO | 2020/189496 A1 | | 9/2020 |

OTHER PUBLICATIONS

Notice of Reasons for Refusal by the Japanese Patent Office on Nov. 25, 2025 in corresponding JP Patent Application No. 2022-023634, with English translation.

* cited by examiner

*Primary Examiner* — Charlotte M Baker
(74) *Attorney, Agent, or Firm* — Carter, DeLuca & Farrell LLP

(57) ABSTRACT

An information processing system capable of preventing imitation of the configuration of a neural network. The information processing system includes an image capturing apparatus and a server that are communicable with each other. In the information processing system, an input layer, a plurality of intermediate layers, and an output layer form the neural network. The input layer and the output layer are disposed in one of the image capturing apparatus and the server. Further, the intermediate layers are disposed such that the intermediate layers are distributed between the first apparatus and the second apparatus.

10 Claims, 6 Drawing Sheets

INFORMATION PROCESSING SYSTEM CAPABLE OF PREVENTING IMITATION OF CONFIGURATION OF NEURAL NETWORK, METHOD OF CONTROLLING IMAGE PROCESSING SYSTEM, AND STORAGE MEDIUM

BACKGROUND OF THE INVENTION

Field of the Invention

The present invention relates to an information processing system, a method of controlling the information processing system, and a storage medium.

Description of the Related Art

Conventionally, there has been known a reasoning apparatus that performs reasoning using a neural network. Particularly, in a reasoning apparatus that performs image recognition, a convolutional neural network (CNN) is used. For example, in a case where a specific object in an image is desired to be recognized, the convolutional neural network sequentially performs processing in intermediate layers and processing in a fully connected layer, on input image data. This gives a final reasoning result in which the specific object included in the image, if any, is recognized. In the intermediate layers, a plurality of feature value extraction layers for extracting the feature values of an object are hierarchically connected. Each feature value extraction layer performs convolution computation, activation, and pooling on data input from the preceding layers. By repeating such processing operations in the feature value extraction layers, it is possible to perform high-dimension extraction of the feature values. Further, in the fully connected layer, data items of the results of computation by the intermediate layers are connected, whereby the final reasoning result is obtained. To obtain the final reasoning result with high accuracy by performing high-dimension extraction of the feature values, the number of the intermediate layers is important.

For example, in an apparatus, such as an image capturing apparatus, which has a relatively low computational power, as the number of intermediate layers is larger, larger computational load is applied to reasoning using the neural network, which results in an increase in processing time. As a solution of this problem, it is envisaged that if an image is transmitted from the image capturing apparatus to a server having a relatively high computational power, and the server performs reasoning using a neural network, it is possible to reduce the processing time. For example, PCT International Patent Publication No. WO 2018/011842 discloses that when the server performs neural network learning, the image capturing apparatus performs processing of some of the intermediate layers, and transmits the results of the processing to the server, whereby the intermediate layers and the output layer of the server perform final processing.

However, in the conventional technique disclosed in PCT International Patent Publication No. WO 2018/011842, in a case where a final reasoning result obtained by the server is further used in the image capturing apparatus, it is necessary to transmit the reasoning result, i.e. data of the results of computation of the output layer of the server, to the image capturing apparatus. In this case, there is a fear that the data of the results of computation transmitted and received between the image capturing apparatus and the server is intercepted by a third party. This third party can configure, i.e. imitate the neural network by imitating the processing by the intermediate layers and the output layer of the server.

SUMMARY OF THE INVENTION

The present invention provides an information processing system that is capable of preventing imitation of the configuration of a neural network, a method of controlling the information processing system, and a storage medium.

The present invention provides an information processing system including a first apparatus and a second apparatus that are communicable with each other, including an input layer, a plurality of intermediate layers, and an output layer, which form a sequential neural network, wherein the input layer and the output layer are disposed in one of the first apparatus and the second apparatus, and wherein the intermediate layers are disposed such that the intermediate layers are distributed between the first apparatus and the second apparatus.

According to the present invention, it is possible to prevent imitation of the configuration of the neural network.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the description of configurations of the following embodiments is given by way of example, and is by no means intended to limit the scope of the present invention to the described configurations.

Figure 1:
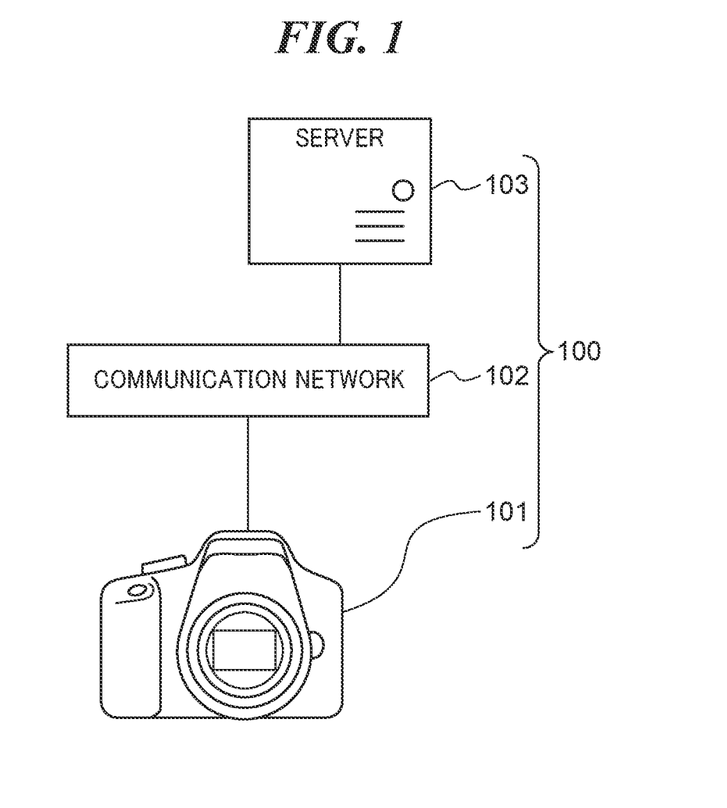
FIG. 1 is a diagram of a whole information processing system according to a first embodiment of the present invention.

A first embodiment will now be described in detail below with reference to FIGS. 1 to 4. FIG. 1 is a diagram of a whole information processing system according to the first embodiment of the present invention. The information processing system 100 shown in FIG. 1 is an example of a reasoning system using a neural network. The information processing system 100 includes an image capturing apparatus 101 as a first apparatus, a server 103 as a second apparatus, and a communication network 102 formed by the Internet and the like. The image capturing apparatus 101 and the serve 103 are communicably connected to each other via the communication network 102, and are capable of transmitting and receiving a variety of data items (pieces of information) therebetween. Although in the present embodiment, the first apparatus is the image capturing apparatus 101 and the second apparatus is the server 103, this is not limitative. For example, the first apparatus may be a mobile phone, a tablet terminal, or the like. Further, it is preferable that the second apparatus has higher computational power than the first apparatus.

Figure 2:
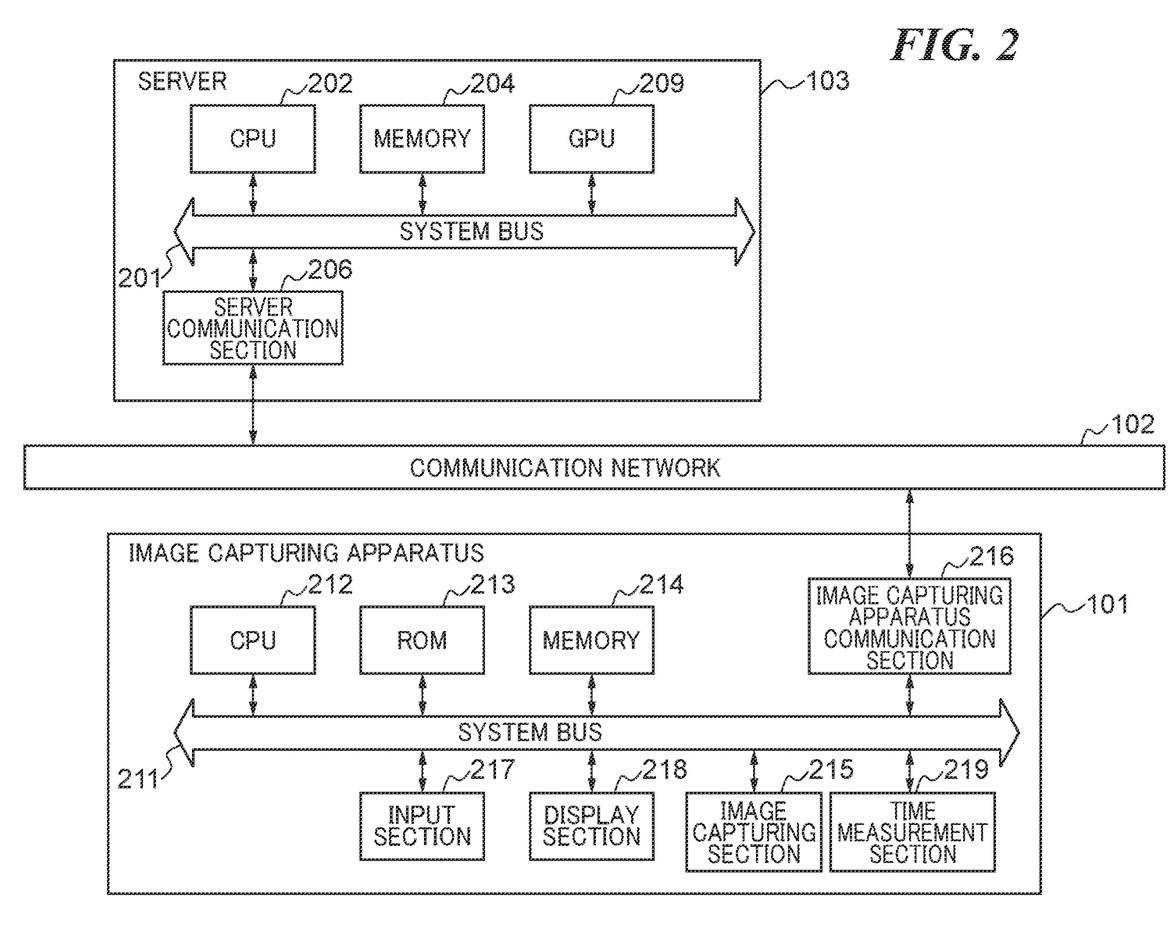
FIG. 2 is a block diagram of the information processing system shown in FIG. 1.

FIG. 2 is a block diagram of the information processing system shown in FIG. 1. As shown in FIG. 2, the image capturing apparatus 101 is comprised of a CPU 212, a ROM 213, a memory 214, an image capturing section 215, and an image capturing apparatus communication section (first communication section) 216. Further, the image capturing apparatus 101 includes an input section 217, a display section 218, and a time measurement section (measurement unit) 219, which are communicably connected to each other via a system bus 211.

The ROM 213 stores a variety of programs and the like. Examples of the variety of programs include a program for causing the CPU 212 (computer) to execute control of the information processing system 100 (to execute a method of controlling the information processing system). Further, the medium for storing the variety of programs is not limited to the ROM 213, but may be a hard disk, for example. The memory 214 is implemented by e.g. a RAM, and is capable of storing a variety of pieces of information. The input section 217 receives an operation from a user who uses the image capturing apparatus 101, and transmits a control signal according to this operation to the CPU 212. The input section 217 is not particularly limited, but is formed by e.g. physical operation buttons, a touch panel, and/or the like.

The CPU 212 is a control unit (first control unit) which controls the respective operations of the ROM 213, the memory 214, the image capturing section 215, the image capturing apparatus communication section (first communication section) 216, the display section 218, and the input section 217. The CPU 212 uses the memory 214 as a work memory according to the programs stored in the ROM 213. For example, the CPU 212 is capable of controlling the display section 218, the image capturing section 215, the image capturing apparatus communication section 216, and so forth, based on control signals from the input section 217 according to associated ones of the programs. With this, it is possible to cause the display section 218, the image capturing section 215, and the image capturing apparatus communication section 216 to perform operations responsive to user operations on the on the input section 217.

The image capturing section 215 is configured to capture an image, and includes, for example, lenses, a shutter having an aperture function, image capturing devices, such as a CCD or a CMOS device, which converts an optical image to electrical signals, and image processing sections (none of which are shown) which perform a variety of image processing operations, including operations for exposure control and ranging control. The image capturing section 215 is capable of capturing an image according to a user operation on the input section 217 under the control of the CPU 212. The display section 218 is implemented by e.g. a liquid crystal display (not shown), and is capable of displaying a variety of images, including an image captured by the image capturing section 215. Note that when the touch panel is used as the input section 217, the input section 217 and the display section 218 can be integrally formed with each other. For example, the touch panel is configured such that it has a light transmittance which does not hinder the display on the display section 218, and is attached to an upper layer of the display surface of the display section 218 (display). Further, input coordinates on the touch panel and display coordinates on the display are associated with each other. Thus, the input section 217 and the display section 218 can be integrally formed with each other. The image capturing apparatus communication section 216 performs communication with the server 103 via the communication network 102 under the control of the CPU 212. Note that the image capturing apparatus communication section 216 and the communication network 102 may be wiredly or wirelessly connected to each other.

As will be described hereinafter, the information processing system 100 includes a first layer 3A, a second layer 3B, and a third layer 3C. The time measurement section 219 can measure time required to complete computation processing by the first layer 3A, time required to complete computation processing by the second layer 3B, and time required to complete computation processing by the third layer 3C, respectively. Further, the time measurement section 219 can measure time required for communication between the first layer 3A and the third layer 3C, and time required for communication between the third layer 3C and the second layer 3B, respectively.

As shown in FIG. 2, the server 103 includes a CPU 202, a memory 204, a server communication section (second communication section) 206, and a graphics processing unit (GPU) 209, which are communicably connected to each other via a system bus 201. Note that the server 103 may further include e.g. a tensor processing unit (TPU), a neural processing unit/neural network processing unit (NPU), or the like.

The memory 204 is implemented by e.g. a RAM, and is used as a work memory for the CPU 202 which is a control unit (second control unit), and the GPU 209. Note that a program for causing e.g. the CPU 202 (computer) to control the information processing system 100 (to execute the method of controlling the information processing system) is stored in e.g. a hard disk (not shown) or a ROM (not shown). The server communication section 206 is capable of performing communication with the image capturing apparatus communication section 216 of the image capturing apparatus 101 via the communication network 102 under the control of the CPU 202. In the present embodiment, upon receipt of a communication request from the image capturing apparatus 101, the CPU 202 of the server 103 generates a control signal according to the communication request, and causes the GPU 209 to operate. Note that the server communication section 206 may be wiredly or wirelessly connected to the communication network 102. Further, communication between the image capturing apparatus 101 (image capturing apparatus communication section 216) and the server 103 (sever communication section 206) will be described in detail hereinafter with reference to FIG. 3.

The GPU 209 is a processor that can perform processing specific to computer graphics operations. In general, the GPU 209 can perform a computing operation, such as a matrix operation, required for the neural network, in a shorter time than the CPU 202. Although in the present embodiment, the CPU 202 and the GPU 209 are arranged such that the CPU 202 and the GPU 209 belong to the server 103, this is not limitative. As described hereinabove, the computational power of the server 103 (in the present embodiment, computational power obtained by adding the computational power of the CPU 202 and that of the GPU 209) is higher than the computational power of the image capturing apparatus 101 (in the present embodiment, that of the CPU 212). Here, the "computational power" refers to a capability of performing computation processing, such as reasoning of the neural network, that is, matrix operations and the like. Although in the configuration shown in FIG. 2, one GPU 209 is arranged, this is not limitative, but there may be arranged a plurality of GPUs 209, for example.

Figure 3:
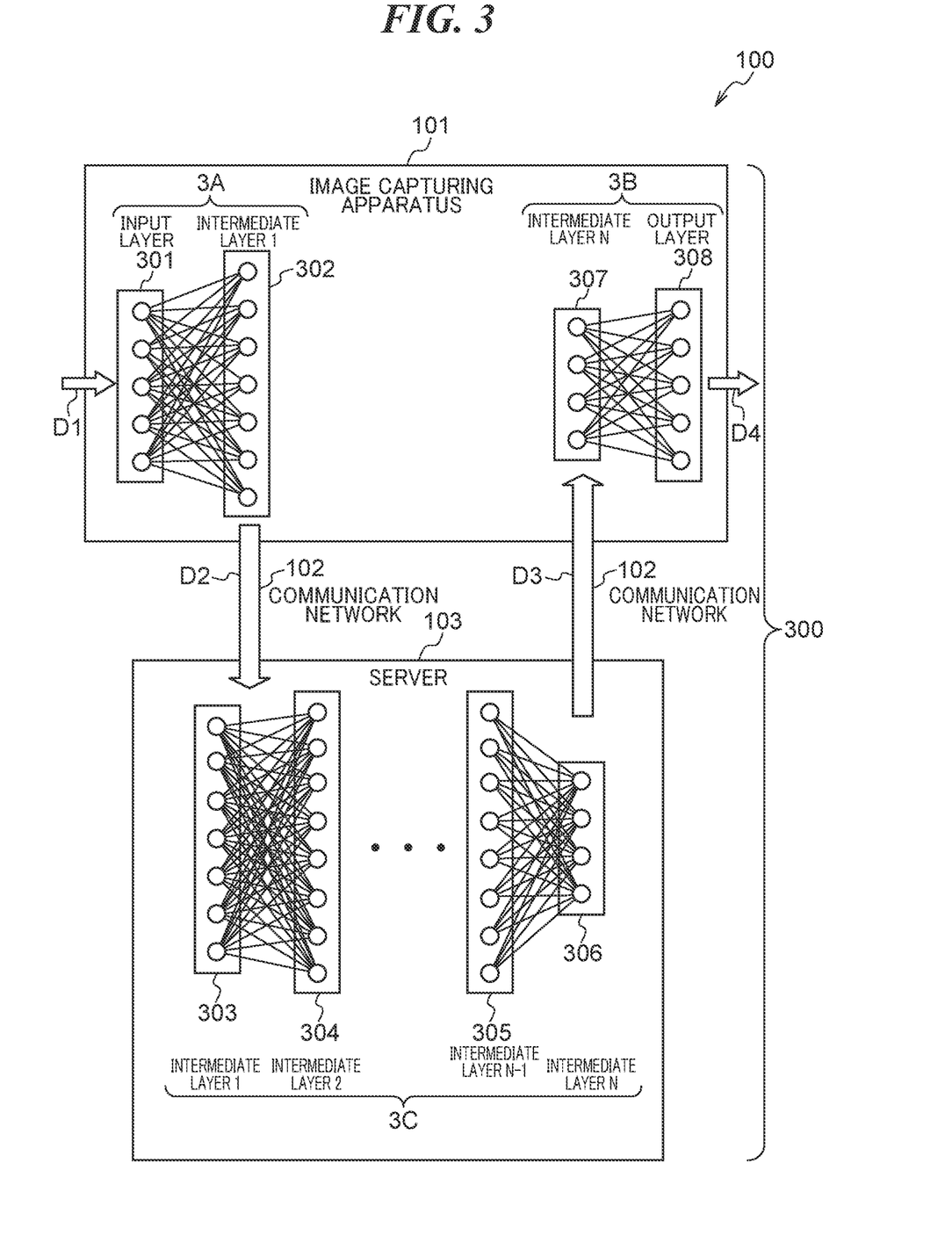
FIG. 3 is a conceptual diagram showing a neural network (reasoning model) used in the information processing system shown in FIG. 1.

FIG. 3 is a conceptual diagram showing the neural network (reasoning model) used in the information processing system shown in FIG. 1. As shown in FIG. 3, the information processing system 100 includes an input layer 301, a plurality of intermediate layers (in the present embodiment, intermediate layers 302 to 307), and an output layer 308. The input layer 301, the intermediate layers (hidden layers) 302 to 307, and the output layer 308 form a sequential neural network 300, and hierarchically perform computation processing (processing). In the present embodiment, data of an image captured by the image capturing section 215 of the image capturing apparatus 101 (image data) is input as input data to the input layer 301, by way of example. Further, a specific object (reasoning result) in the image data is output as output data from the output layer 308. The intermediate layers 302 to 307 have data input thereto from preceding layers and extract feature values of the object from the data.

In the neural network 300 shown in FIG. 3, the input layer 301 and the output layer 308 are disposed in the image capturing apparatus 101 out of the image capturing apparatus 101 and the server 103. On the other hand, the intermediate layers 302 to 307 are distributed between the image capturing apparatus 101 and the server 103. In the present embodiment, the intermediate layer (intermediate layer 1) 302 and the intermediate layer (intermediate layer N) 307 are disposed in the image capturing apparatus 101, and the intermediate layer (intermediate layer 1) 303, the intermediate layer (intermediate layer 2) 304, . . . , the intermediate layer (intermediate layer N−1) 305 and the intermediate layer (intermediate layer N) 306 are collectively disposed in the server 103. In the image capturing apparatus 101, the first layer 3A is formed by the input layer 301 and the intermediate layer (intermediate layer 1) 302, and the second layer 3B is formed by the intermediate layer (intermediate layer N) 307 and the output layer 308. Computation processing by the first layer 3A and the second layer 3B is performed (controlled) by an associated program started by the CPU 212 of the image capturing apparatus 101. Although each of the first layer 3A and the second layer 3B has one intermediate layer, this is not limitative, but they each may have e.g. a plurality of intermediate layers, depending on the configuration of the neural network 300.

In the server 103, the third layer 3C is formed by the intermediate layers 303 to 306. Computation processing by the third layer 3C is performed (controlled) by an associated program started by the CPU 202 of the server 103. Further, the third layer 3C is communicable with the first layer 3A and the second layer 3B. In the present embodiment, the image capturing apparatus communication section 216 of the image capturing apparatus 1 transmits a computation result output from the intermediate layer (intermediate layer 1) 302 of the first layer 3A to the server communication section 206 of the server 103 via the communication network 102. With this, the computation result output from the intermediate layer (intermediate layer 1) 302 is input to the intermediate layer (intermediate layer 1) 303 of the third layer 3C. Further, the server communication section 206 transmits a computation result output from the intermediate layer (intermediate layer N) 306 of the third layer 3C to the image capturing apparatus communication section 216 via the communication network 102. With this, the computation result output from the intermediate layer (intermediate layer N) 306 is input to the intermediate layer (intermediate layer N) 307 of the second layer 3B. Although as the third layer 3C, four intermediate layers are explicitly shown, this is not limitative, but the third layer 3C may have e.g. one to three, or five or more intermediate layers, depending on the configuration of the neural network 300.

Note that in the present embodiment, the reasoning model of the information processing system 100 is, for example, a learning model that uses a neural network having parameters adjusted by back propagation or the like. With this, the reasoning model can perform deep learning, for example, which generates by itself a variety of parameters, such as feature values and weights, for machine learning. Note that the machine learning is not limited to the deep learning. For example, machine learning may be employed which uses any suitable machine learning algorithm, such as a support vector machine, a logistic regression, or a decision tree. Further, the number of nodes and the weights of synapses in the reasoning model (the neural network 300) are not limited to those of the configuration shown in FIG. 3. Further, bias can be set, as deemed appropriate.

In the neural network 300 configured as above, as shown in FIG. 3, the output layer 308 is not disposed in the server 103 but in the image capturing apparatus 101. In this case, the result of computation performed by the server 103, more specifically by the intermediate layer (intermediate layer N) 306, is input to the intermediate layer (intermediate layer N) 307 of the image capturing apparatus 101. Then, the computation result is processed by the output layer 308, and is output. As described hereinabove, the server 103 (second control unit) has a higher computational power than the image capturing apparatus 101 (first control unit). That is, the server 103 has a faster processing speed than the image capturing apparatus 101. Therefore, when a computation processing time is taken into account, the whole computation is terminated in a shorter time in a case where the output layer 308 is disposed in the server 103 and computation is performed up to the output layer 308 (hereinafter referred to as the "comparative example configuration") than in a case where the output layer 308 is disposed in the image capturing apparatus 101.

However, the comparative example configuration makes it possible to imitate the reasoning model used in the layers located rearward of the intermediate layer (intermediate layer 1) 302. This is because there is a fear that in a case where relearning of the neural network is performed using the computation result of the output layer 308 and the computation result of the intermediate layer (intermediate layer 1) 302, the reasoning model of the server 103 in the comparative example configuration can be imitated.

To solve this problem, the neural network 300 (the information processing system 100) is configured such that the above imitation of the reasoning model can be prevented. In the following, this configuration and advantageous effects thereof will be described.

Figure 4:
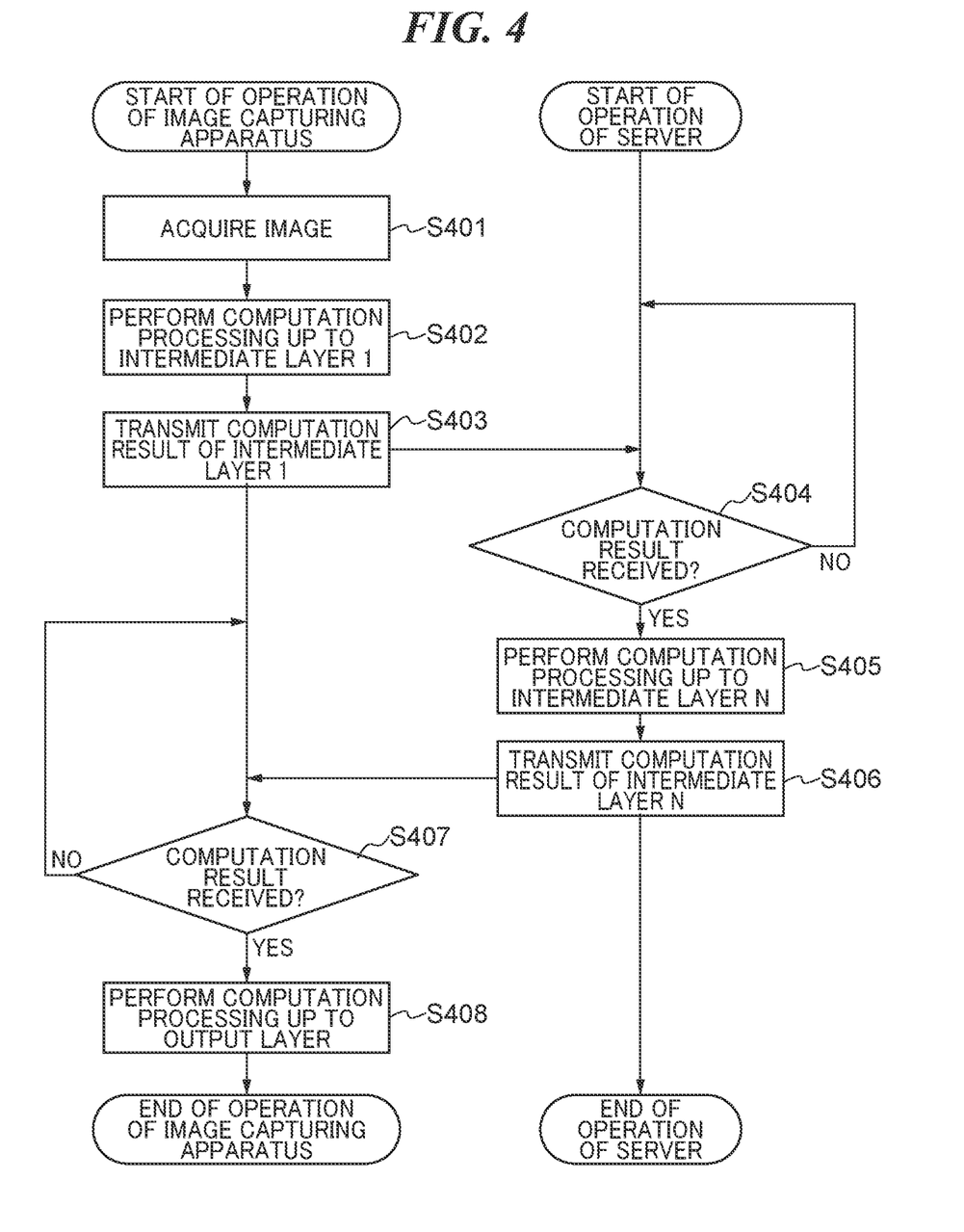
FIG. 4 is a flowchart of a reasoning process performed by the information processing system shown in FIG. 1.

FIG. 4 is a flowchart of a reasoning process performed by the information processing system shown in FIG. 1. As shown in FIG. 4, when the image capturing apparatus 101 operates to start the reasoning process of the information processing apparatus 101, in a step S401, the CPU 212 of the information processing apparatus 101 causes the image capturing section 215 to operate to acquire image data. This image data is used as input data D1 which is input to the input layer 301 of the first layer 3A.

In a step S402, the CPU 212 controls the first layer 3A to perform computation processing. With this, intermediate data (a first processing result) D2 is obtained by the first layer 3A.

In a step S403, the CPU 212 performs control such that the image capturing apparatus communication section 216 operates to output the intermediate data D2 from the intermediate layer (intermediate layer 1) 302 of the first layer 3A. This intermediate data D2 is transmitted to the server communication section 206 via the communication network 102. Further, after execution of the step S403, in a step S407, the CPU 212 waits until a computation processing result from the server 103 is received.

On the other hand, when the server 103 operates to start the reasoning process, in a step S404, the CPU 202 of the server 103 determines whether or not the intermediate data D2 has been received by the server communication section 206. If it is determined in the step S404 by the CPU 202 that the intermediate data D2 has been received, the process proceeds to a step S405. On the other hand, it is determined in the step S404 by the CPU 202 that the intermediate data D2 has not been received, the CPU 202 waits until the intermediate data D2 is received.

In the step S405, the CPU 202 and the GPU 209 perform control to cause the third layer 3C to perform computation processing. With this, the intermediate data D2 input to the intermediate layer (intermediate layer 1) 303 of the third layer 3C is sequentially processed by the intermediate layers 303 to 306. With this processing, intermediate data (a second processing result) D3 is obtained.

In a step S406, the CPU 202 performs control such that the image capturing apparatus communication section 216 operates to output the intermediate data D3 from the intermediate layer (intermediate layer N) 306 of the third layer 3C. The intermediate data D3 is transmitted to the image capturing apparatus communication section 216 via the communication network 102, and the operation of the server 103 is terminated.

In the step S407, the CPU 212 of the information processing apparatus 101 determines whether or not the intermediate data D3 has been received by the image capturing apparatus communication section 216. If it is determined in the step S407 by the CPU 212 that the intermediate data D3 has been received, the process proceeds to a step S408. On the other hand, it is determined in the step S407 by the CPU 212 that the intermediate data D3 has not been received, the CPU 212 waits until the intermediate data D3 is received.

In the step S408, the CPU 212 performs control to cause the second layer 3B to perform computation processing. With this, the intermediate data D3 input to the intermediate layer (intermediate layer N) 307 of the second layer 3B is processed by the intermediate layer (intermediate layer N) 307, and then is output from the output layer 308 as output data (a third processing result) D4, and the operation of the image capturing apparatus 101 is terminated. In the output data D4, the above-mentioned object is identified.

With the configuration (control) described above, the input data D1 to the input layer 301 and the output data D4 from the output layer 308 are processed by one image capturing apparatus 101, i.e. the common image capturing apparatus, and hence the input data D1 and the output data D4 are prevented from being intercepted from outside. Further, the intermediate data D2 and the intermediate data D3 are transmitted and received between the image capturing apparatus 101 and the server 103. Even if both or one of the intermediate data D2 and the intermediate data D3 is/are intercepted from outside, it is impossible to configure a neural network (reasoning model) such that the neural network derives the output data D4, by using only the intercepted intermediate data D2 and/or D3. Since interception of data can be prevented as described above, it is possible to prevent the configuration of the neural network 300 from being imitated based on the data, i.e. possible to conceal the configuration of the neural network 300.

Further, for example, in a case where the intermediate layer (intermediate layer 1) 303 is the same intermediate layer as the intermediate layer (intermediate layer 1) 302, and the intermediate layer (intermediate layer 1) 302 performs fully-connected computation processing, it is not required that the intermediate layer (intermediate layer 1) 303 performs the fully-connected computation processing. Further, for example, in a case where the intermediate layer (intermediate layer N) 306 is the same as the intermediate layer (intermediate layer N) 307, it is only required that one of the intermediate layers 306 and 307 performs the fully-connected computation processing. Note that in a case where the amount of communication data transmitted and received between the image capturing apparatus 101 and the server 103 is relatively small, a communication time is short, and hence it is preferable that both the intermediate layers 302 and 306 perform the fully-connected computation processing.

As described hereinabove, the server 103 has a higher computational power than the image capturing apparatus 101. Therefore, with respect to the amount of computation by the entire neural network 300, as the amount of computation by the server 103 is larger, in other words, as the number of the intermediate layers of the server 103 is larger, it is possible to make shorter a computation processing time of the entire neural network 300. Other configurations of the neural network 300 for reducing the computation processing time of the entire neural network 300 are as follows:

For example, there is a configuration in which the intermediate layers 303 to 306 are disposed also in the image capturing apparatus 101. Further, in the image capturing apparatus 101, a computation processing time (hereinafter referred to as the "image capturing-side computing time") of the intermediate layers 303 to 306 is measured by the time measurement section 219, and is stored in the memory 214. Further, a computation processing time (hereinafter referred to as the "server-side computing time") of the intermediate layers 303 to 306 of the server 103 is also measured by the time measurement section 219, and is stored in the memory 204. Data concerning the server-side computing time is transmitted to the image capturing apparatus 101 via the communication network 102.

Before execution of the step S403, the CPU 212 of the information processing system 101 determines whether or not the server-side computing time has been received. If the CPU 212 determines that the server-side computing time has been received, the CPU 212 compares the image capturing-side computing time and the server-side computing time, and determines which computing time is shorter. If the CPU 212 determines that the server-side computing time is shorter, the steps S403 to S408 are sequentially executed. On the other hand, if the CPU 212 determines that the image capturing-side computing time is shorter, the step S403 is not executed. In this case, the processing by the intermediate layers 303 to 306 of the server 103 is not performed, but the processing by the intermediate layers 303 to 306 of the image capturing apparatus 101 is performed.

As described above, whether or not to use the intermediate layers 303 to 306 of the server 103 can be switched according to which of the image capturing-side computing time and the server-side computing time is shorter. With this, even in a case where the whole computation processing of the neural network 300 is performed only by the image capturing apparatus 101, it is possible to reduce the computation processing time required for the processing.

Further, to accurately determine the processing time, there may be used a configuration (method) in which the communication time between the image capturing apparatus 101 and the server 103 is taken into consideration. In this configuration, time required for communication of a predetermined amount of data between the image capturing apparatus 101 and the server 103 is measured in advance by the time measurement section 219. The CPU 212 of the information processing apparatus 101 converts the result of the measurement by the time measurement section 219 to a communication speed (data transfer rate) between the image capturing apparatus 101 and the server 103. The CPU 212 calculates a communication time (hereinafter referred to as the "first communication time") required for transmission in the step S403 based on the amount of data and the communication speed during execution of the step S403. Further, the CPU 212 calculates a communication time (hereinafter referred to as the "second communication time") required for transmission in the step S407 based on the amount of data and the communication speed during execution of the step S407. Then, the CPU 212 adds the first communication time and the second communication time to the server-side computing time, and sets the resulting total time as a processing time required for the computation processing by the intermediate layer (intermediate layer 1) 302 to the intermediate layer (intermediate layer N) 307. With this, it is possible to accurately determine the processing time by taking into consideration the time required for communication between the image capturing apparatus 101 and the server 103. Further, this configuration is effective since a processing time can be accurately determined also in a case where the information processing system 100 includes a plurality of servers 103, and computation processing can be performed by one of the servers 103.

Figure 5:
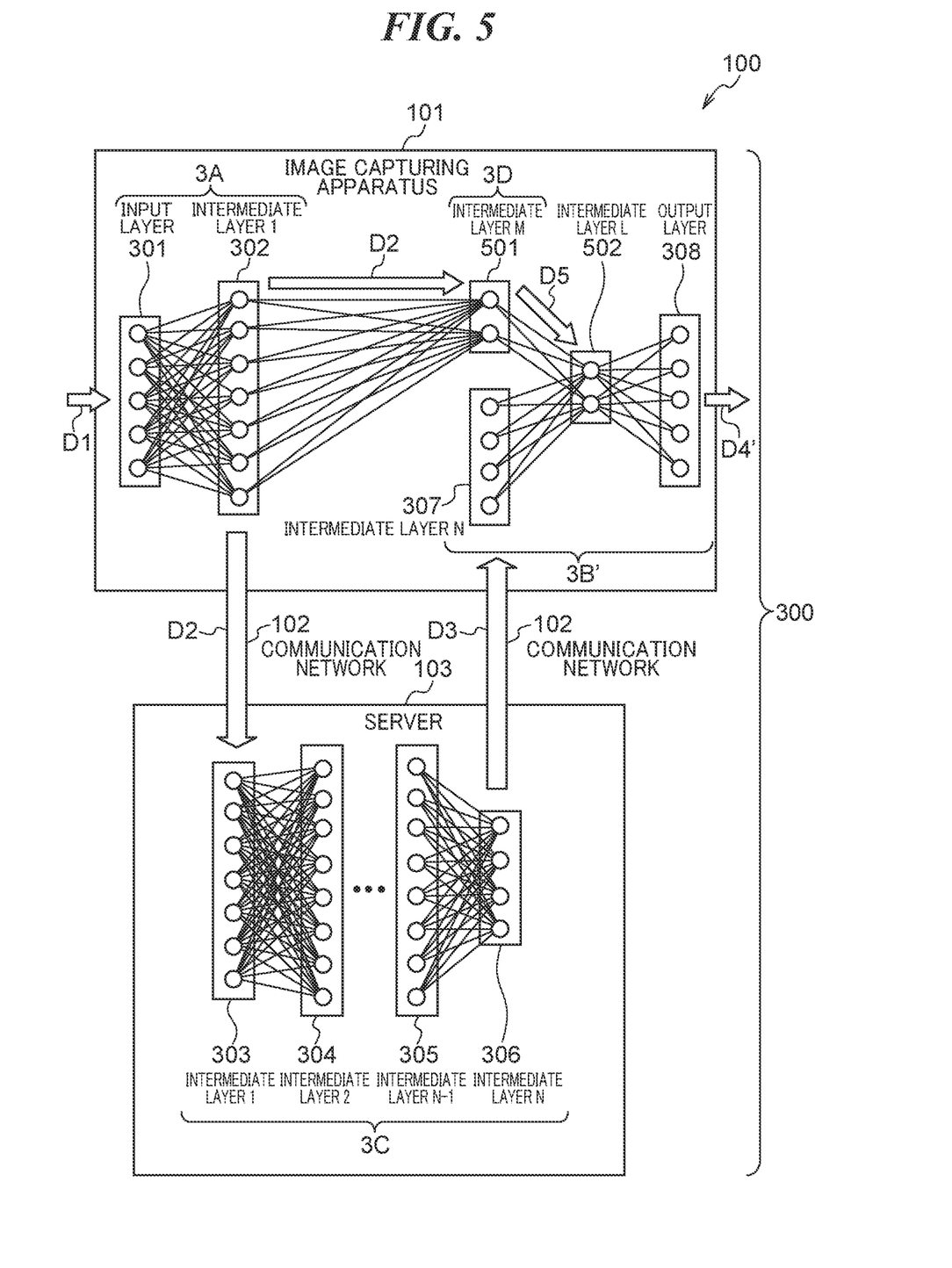
FIG. 5 is a conceptual diagram showing a neural network (reasoning model) used in an information processing system according to a second embodiment of the present invention.

Next, a second embodiment will be described with reference to FIGS. 5 and 6. FIG. 5 is a conceptual diagram showing a neural network (reasoning model) used in an information processing system according to the second embodiment of the present invention. As shown in FIG. 5, in the present embodiment, the image capturing apparatus 101 includes a fourth layer 3D formed by an intermediate layer (intermediate layer M) 501. Computation processing by the fourth layer 3D is performed in parallel with the computation processing by the third layer 3C of the server 103. In the present embodiment, the intermediate data D2 is input from the first layer 3A to the intermediate layer (intermediate layer M) 501. With this, by processing the intermediate data D2, the intermediate layer (intermediate layer M) 501 can output intermediate data (a fourth processing result) D5. This intermediate data D5 is input to a second layer 3B'. Although the fourth layer 3D includes one intermediate layer, this is not limitative, but the fourth layer 3D may have e.g. a plurality of intermediate layers depending on the configuration of the neural network 300.

The second layer 3B' includes an intermediate layer (intermediate layer L) 502 disposed between the intermediate layer (intermediate layer N) 307 and the output layer 308. To the intermediate layer 502, not only the intermediate data D5 but also data from the intermediate layer (intermediate layer N) 307 is input. With this, the intermediate data D3 and the intermediate data D5 are processed by the second layer 3B', whereby output data (processing result) D4' is output from the output layer 308. Note that the intermediate layer 502 may be omitted from the second layer 3B'. In this case, the intermediate data D5 and the data from the intermediate layer (intermediate layer N) 307 are input to the output layer 308.

As described above, in the present embodiment, the intermediate layer (intermediate layer M) 501 is disposed in the image capturing apparatus 101. The intermediate data D5 output from the intermediate layer (intermediate layer M) 501 is not transmitted to the server 103 but is used for the processing within the image capturing apparatus 101. With this, it is possible to prevent the intermediate data D5 from being intercepted from outside, which therefore further contributes to imitation prevention of the configuration of the neural network 300. It is preferable that the computation processing time of the fourth layer 3D (the intermediate layer (intermediate layer M) 501) is shorter than the computation processing time of the third layer 3C. With this, it is possible to prevent the total computation processing time of the neural network 300 from being increased under the influence of the computation processing by the fourth layer 3D.

Figure 6:
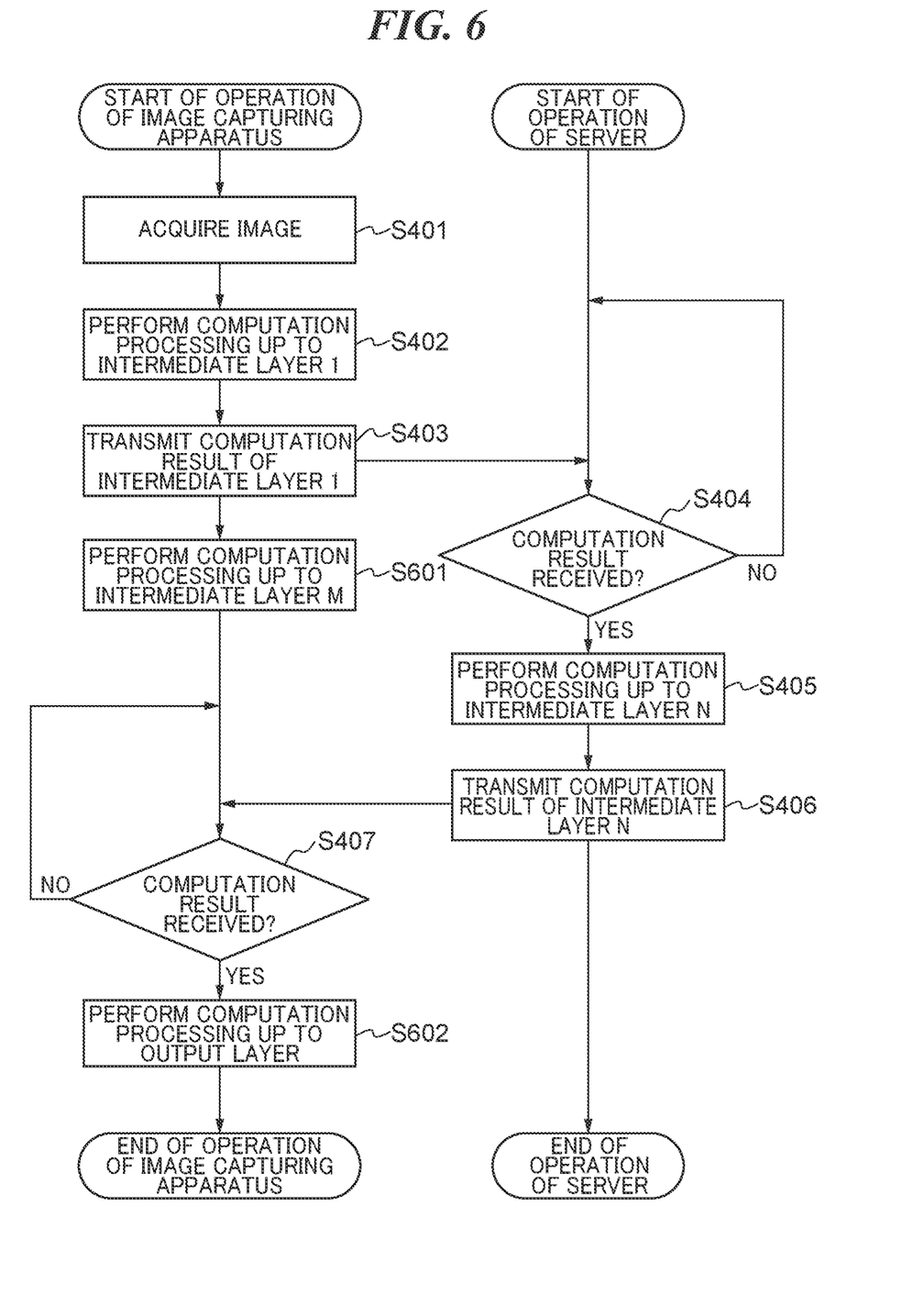
FIG. 6 is a flowchart of a reasoning process performed by the information processing system shown in FIG. 5.

FIG. 6 is a flowchart of a reasoning process performed by the information processing system shown in FIG. 5. Note that steps S401 to S407 of the flowchart in FIG. 6 are the same as those of the flowchart in FIG. 4.

After execution of the step S403, in a step S601, the CPU 212 controls the fourth layer 3D to perform computation processing. With this, the intermediate data D5 is obtained by the fourth layer 3D, and is input to the intermediate layer 502 of the second layer 3B'.

After execution of the step S601, in the step S407, the CPU 212 waits until a computation processing result is received from the server 103. If the CPU 212 determines in the step S407 that the intermediate data D3 has been received, the process proceeds to a step S602.

In the step S602, the CPU 212 controls the second layer 3B to perform computation processing. With this, the intermediate data D3 and the intermediate data D5 are processed, and output data D4' is output from the output layer 308. In the output data D4', the above-mentioned object is specified. After execution of the step S602, the operation of the image capturing apparatus 101 is terminated.

With the control described above, it is possible to prevent the intermediate data D5 from being intercepted from outside, whereby it is possible to improve imitation prevention (concealment) of the configuration of the neural network 300.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023634 filed Feb. 18, 2022, which is hereby incorporated by reference herein in its entirety.

What is claimed is:

1. An information processing system including a first apparatus and a second apparatus that are communicable with each other, comprising:
    an input layer, a plurality of intermediate layers, and an output layer, which form a sequential neural network,
    wherein the input layer and the output layer are disposed in one of the first apparatus and the second apparatus,
    wherein the intermediate layers are disposed such that the intermediate layers are distributed between the first apparatus and the second apparatus,
    wherein the first apparatus includes a first layer formed by the input layer and at least one of the intermediate layers, and a second layer formed by at least one of the intermediate layers and the output layer,
    wherein the second apparatus includes a third layer formed by at least one of the intermediate layers and communicable with the first layer and the second layer,
    wherein the first layer outputs a first processing result,
    wherein the first processing result is input to the third layer, and the third layer outputs a second processing result obtained by processing the first processing result, and
    wherein the second processing result is input to the second layer, and the second layer outputs a third processing result obtained by processing the second processing result.

2. The information processing system according to claim 1, wherein the first apparatus is an image capturing apparatus that captures an image,
    wherein the second apparatus is a server, and
    wherein the input layer and the output layer are disposed in the first apparatus.

3. The information processing system according to claim 1, further comprising a measurement unit that is capable of measuring time required to complete processing by at least the third layer.

4. The information processing system according to claim 3, wherein the measurement unit is capable of measuring time required for communication between the first layer and the third layer, and time required for communication between the third layer and the second layer.

5. The information processing system according to claim 1, wherein the first apparatus includes a fourth layer formed by at least one of the intermediate layers,
    wherein the first processing result is input to the fourth layer, and the fourth layer outputs a fourth processing result obtained by processing the first processing result, and
    wherein the second processing result and the fourth processing result are input to the second layer, and the second layer outputs a processing result obtained by processing the second processing result and the fourth processing result.

6. The information processing system according to claim 1, wherein the first apparatus includes a first control unit for controlling processing by the intermediate layers included in the first apparatus, processing by the input layer, and processing by the output layer, and
    wherein the second apparatus includes a second control unit for controlling processing by the intermediate layers included in the second apparatus, the second control unit being faster in processing speed than the first control unit.

7. The information processing system according to claim 1, wherein the second apparatus is configured to be capable of switching whether or not to use the intermediate layers included in the second apparatus.

8. The information processing system according to claim 1, wherein the first apparatus includes a first communication section, and
    wherein the second apparatus includes a second communication section communicable with the first communication section.

9. A non-transitory computer-readable storage medium storing a program for causing a computer to execute a method of controlling an information processing system which includes a first apparatus and a second apparatus communicable with each other, and has an input layer, a plurality of intermediate layers, and an output layer, which form a sequential neural network, wherein the input layer and the output layer are disposed in one of the first apparatus and the second apparatus, and the intermediate layers are disposed such that the intermediate layers are distributed between the first apparatus and the second apparatus,
    wherein the method comprises:
    controlling processing by the input layer, the intermediate layers, and the output layer,
    wherein the first apparatus includes a first layer formed by the input layer and at least one of the intermediate layers, and a second layer formed by at least one of the intermediate layers and the output layer,
    wherein the second apparatus includes a third layer formed by at least one of the intermediate layers and communicable with the first layer and the second layer,
    wherein the first layer outputs a first processing result,
    wherein the first processing result is input to the third layer, and the third layer outputs a second processing result obtained by processing the first processing result, and
    wherein the second processing result is input to the second layer, and the second layer outputs a third processing result obtained by processing the second processing result.

10. A method of controlling an information processing system which includes a first apparatus and a second apparatus communicable with each other, and has an input layer, a plurality of intermediate layers, and an output layer, which form a sequential neural network, wherein the input layer and the output layer are disposed in one of the first apparatus and the second apparatus, and the intermediate layers are disposed such that the intermediate layers are distributed between the first apparatus and the second apparatus, the method comprising:
    controlling processing by the input layer, the intermediate layers, and the output layer, wherein the first apparatus includes a first layer formed by the input layer and at least one of the intermediate layers, and a second layer formed by at least one of the intermediate layers and the output layer, wherein the second apparatus includes a third layer formed by at least one of the intermediate layers and communicable with the first layer and the second layer, wherein the first layer outputs a first processing result, wherein the first processing result is input to the third layer, and the third layer outputs a second processing result obtained by processing the first processing result, and wherein the second processing result is input to the second layer, and the second layer outputs a third processing result obtained by processing the second processing result.

\* \* \* \* \*